Jan. 6, 1970  C. GOLDMAN  3,488,411
PRODUCTION OF LOW DENSITY THIN GAUGE PLASTIC ARTICLES
Filed April 20, 1966  7 Sheets-Sheet 1

Conrad Goldman INVENTOR.

Conrad Goldman INVENTOR.

United States Patent Office 3,488,411
Patented Jan. 6, 1970

3,488,411
PRODUCTION OF LOW DENSITY THIN
GAUGE PLASTIC ARTICLES
Conrad Goldman, Rochester, N.Y., assignor, by mesne
assignments, to Alumacraft Marine Products Corporation, Minneapolis, Minn., a corporation of Delaware
Continuation-in-part of application Ser. No. 172,413,
Feb. 12, 1962. This application Apr. 20, 1966, Ser.
No. 549,751
Int. Cl. B29c 3/02, 27/08; B29g 7/02
U.S. Cl. 264—24                              7 Claims

ABSTRACT OF THE DISCLOSURE

A foamed plastic article shaped to a desired form is made from plastic material requiring a heating step to bring it to the desired form. The plastic material may be either thermoplastic or thermosetting. The plastic material is applied to a travelling mold of the required shape, and is subjected to heat while in contact with the mold. The formed article is then shifted from the mold which was heated to an intermediate transfer mold, and from the transfer mold to a travelling cooling mold which carries the formed article through a cooling zone. The forming mold stays relatively hot and does not travel in the cooling zone. The cooling mold stays relatively cool and does not enter the heating zone.

This application is a continuation-in-part of copending application, Ser. No. 172,413, filed Feb. 12, 1962 and now abandoned, for Production of Low Density Thin Gauge Plastic Material From Powdered Feed Stock.

This invention relates in general to plastic material and, more particularly, in one aspect to making thin gauge webbing, sheeting and thin walled, low density shaped articles from foamed and foamable powders.

Foamed plastics are commercially available which possess a wide range of physical properties. However, thin gauge webbing (10 mils and under) of low density (10 pounds per cubic foot and under), which is competitively priced with treated or untreated paper, is limited to only a few plastic materials at present, an example of such a plastic material being foamed polystyrene.

Foamed polystyrene webbing that is commercially available in thicknesses of 10 mils and under and with densities of 10 pounds per cubic foot and under is produced by the blown film technique. Densities lower than about 10 pounds per cubic foot are difficult to obtain without resorting to post treatment processes, due to inherent processing conditions involved in the blown film technique and the resin formulations available commercially. The lowest density reported is 4 pounds per cubic foot.

Where the webbing is to be further processed by embossing, laminating or vacuum forming, it is required for best results that the webbing be non-oriented when originally produced. In order to produce non-oriented foamed polystyrene webbing by the blown film technique, production rates on a square footage basis are at a minimum (when compared to the production of oriented foamed polystyrene webbing), and, in comparison to square footage rates obtained in the production of other plastic webbing or paper of equal weight per square foot, are exceptionally low.

An object of this invention is to produce thin gauge webbing of 1–5 mils thickness, using low density foamed polystyrene powder as feed material.

Another object of this invention is to produce thin gauge webbing of 1–4 pounds per cubic foot density, using low density foamed polystyrene powder as feed material.

A further object of this invention is to produce a non-oriented webbing, using low density foamed polystyrene powder as feed material.

An additional object of this invention is to produce at high production rates thin gauge, low density webbing from foamed polystyrene powder.

An object of this invention is to produce thin gauge, low density webbing having fine pore size from low density foamed polystyrene.

Another object of this invention is to produce thin gauge low density webbing from low density foamed polystyrene powder by applying the powder to a continuous porous conveyor and transporting it through a fusion zone to produce a continuous webbing.

A further object of this invention is to produce thin gauge low density webbing from unfoamed, but heat foamable, polystyrene powder, using a porous conveyor belt in combination with a conveyorized oven.

An additional object of this invention is to produce thin gauge low density sheeting from low density foamed polystyrene powder by pre-fusing the powder in an oven to form webbing and then forming the webbing into sheeting in a roll type sheeting die.

Another object of this invention is to produce laminates of thin gauge low density foamed polystyrene and high impact polystyrene by applying low density foamed polystyrene powder to high impact polystyrene sheeting, and fusing the powder on the sheeting in an oven.

A further object of this invention is to produce laminates of fabric and thin gauge, low density foamed polystyrene from low density foamed polystyrene powder.

An additional object of this invention is to produce laminates of fabric and thin gauge low density foamed polystyrene from heat foamable, unfoamed polystyrene powder.

An object of this invention is to produce laminates of paper and thin gauge low density foamed polystyrene from low density foamed polystyrene powder.

Another object of this invention is to produce laminates of paper and thin gauge low density foamed polystyrene from unfoamed, heat foamable polystyrene powder.

A further object of this invention is to produce shaped articles, the walls of which are laminates of low density, foamed, fused polystyrene powder and high impact polystyrene.

An additional object of this invention is to produce shaped articles, the walls of which are laminates of unfoamed, heat foamable polystyrene powder and high impact polystyrene.

An object of this invention is to make in porous molds shaped articles of low density, thin gauge foamed polystyrene from foamed low density polystyrene powder.

Another object of this invention is to make in porous molds shaped articles of low density, thin gauge foamed polystyrene from unfoamed, heat foamable polystyrene powder.

An important object of this invention is a thermally efficient continuous process for thermoforming (forming with heat) in molds shaped articles from thermoplastic resin compositions, wherein the molds comprise shaped article defining structures or mold face pieces. In this process the shaped articles are formed in the face pieces in the molds in a hot zone, the face pieces with articles therein are transferred to transfer molds which pass through a transfer zone and then the face pieces are transferred to cooling molds which pass through a cooling zone wherein the articles are cooled to the temperatures desired for further handling.

Other objects of this invention will be apparent hereinafter from the specification and from the appended claims.

Foamed polystyrene powder is obtained by grinding expandable pellets or beads of polystyrene and heat treating the ground material to produce fine particle size foamed powders. Foamed or foamable polystyrene powders can also be produced by processes disclosed in the U.S. Patent, No. 2,442,940, to Staudinger et al.

The term "powder" as herein employed refers to normally solid material in a finely divided condition with the particles thereof generally being finer than 10 mesh U.S. screen size, being preferably in a range from about 1 to about 1000 microns and usually in a range from about 10 to about 250 microns. The particles can be irregularly shaped as in the case of particles obtained by comminuting coarser particles, and they can be spherical as in the case of multicellular beads and in the case of hollow spheres such as those disclosed in the U.S. Patent No. 2,797,201, to Veatch et al., and the like. Low density foamed powder is powder, the particles of which are in an expanded foamed condition, whereby the particles have densities lower than the density of the normally solid portions of the particles. The degree of expansion in these expanded particles is in a range from about 2 to about 60 volumes, although lesser and greater volumes are within the broader concepts of this invention. Such powder is obtained by spray drying a solution of a film forming resin, producing Microballoons, as taught in the Veatch et al. patent, and by heating to the softening point particles of thermoplastic resin material containing a blowing agent such as, for example, a volatile liquid, a heat decomposable chemical which forms a gas on thermal decomposition, and the like, examples of which are well known. Under the concepts of this invention thermoplastic resin compositions consist essentially of a normally solid resin in the thermoplastic state. Such a resin includes resins which are always thermoplastic, as well as thermosetting resins in the thermoplastic stage of partial polymerization, which are referred to as stage B thermoset resins. Examples of thermoplastic resins include poly (1-olefins) wherein each 1-olefin unit has 2–20 carbon atoms, such as polyethylene, polypropylene, poly(1-butene), polystyrene and the like, polyvinyl resins such as, for example, polyvinyl alcohol, polyvinyl chloride, copolymers of vinyl chloride and vinyl acetate, polyvinyl butyral, polyvinylidene chloride, and the like, acrylate resins such as, for example, poly(methyl methacrylate), and the like, polyamide resins such as nylon, and the like, including copolymers, block polymers, blends and the like, including, for example, acrylonitrile-butadiene-styrene (ABS) copolymers and ethylene-vinyl acetate (EVA) copolymers. The thermosetting resins which have a thermoplastic stage of partial polymerization include the polyester, alkyd, polysiloxane, phenol-formaldehyde, urea-formaldehyde, melamine-formaldehyde, epoxy and the like resins.

Figure 1:
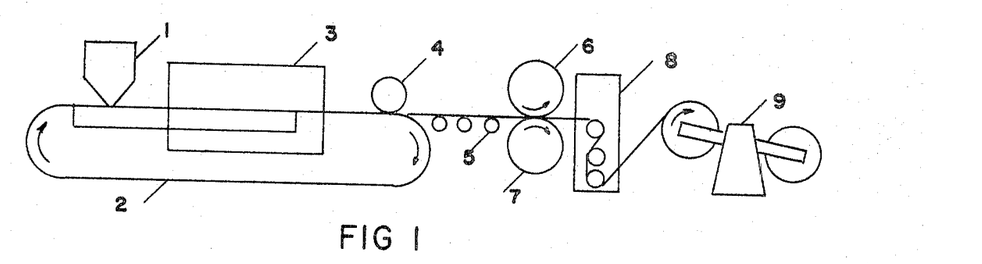
FIG. 1 is a diagram of a continuous process for producing low density, thin gauge webbing from foamed powder.

In the continuous process of FIG. 1 thin gauge webbing of about 1–5 mils thickness and density of about 1–4 pounds per cubic foot is produced from low density foamed polystyrene powder having an average particle size generally in a range from about 1 to about 1000 microns and preferably in a range from about 10 to about 250 microns. This is done by depositing the foamed powder from a powed applicator 1 onto a continuous porous belt 2, and fusing the powder in a heating zone 5. Temperature in the heating zone is 225–250° F., for example. Vacuum can be applied to the belt, if desired, to restrict expansion of the foamed beads to a vertical dimension by preventing lateral spreading of the layer in contact with the porous belt. The fused webbing of low density foamed polystyrene is automatically removed from the continuous belt with the aid of a vacuum transfer roll 4. Guide rolls 5 guide the webbing through a calender stack, wherein rolls 6 and 7 smooth and dimension the webbing. It preferably is then passed through a static eliminator unit 8 and then the webbing is wound on rolls in a windup unit 9.

The porosity of the belt 2 is such that substantially no foamed powder passes through the belt. When using 200 mesh powder, a belt of 325 mesh wire screen or smooth durable cloth of equal porosity is suitable. In addition, the belt material is such that the fused powdered polystyrene does not adhere to the belt (except by pneumatic forces). In using 200 mesh powder, a coarse screen (40–60 mesh) coated with silicone rubber or polytetrafluoroethylene to reduce the porosity to the equivalent of a 325 mesh screen has adequate physical strength and flexibility, the required fineness of porosity, and suitable release properties for use in this process.

In a modification of the process of FIG. 1, foamable polystyrene powder, having an average particle size generally in a range from about 1 to about 1000 microns and preferably in a range from about 10 to about 250 microns is used instead of foamed powder, and the density of the foamed article is dependent upon the temperature to which the powder is heated, the ambient pressure, the amount of foaming agent in the powder, and the resin used. Because an equilibrium exists between the vapor pressure of the gases within the fused "bubbles" and ambient pressure, control of the bubble diameter or pore size of the fused powder is effected by controlling the ambient pressure. Ambient pressure as used herein refers to the pressure of the gas surrounding the powder particles. Reduced pressures (vacuum) within oven 3 results in larger pore sizes and less dense material, while increased pressures within the oven 3 results in finer pore sizes and denser material. Ambient pressure also affects the bursting of bubbles. While higher temperatures result in larger pore size and reduced density, suitable ambient pressures are necessary to prevent substantial bubble bursting which results in reduced numbers of pores, and higher density material.

Figures 2, 7:
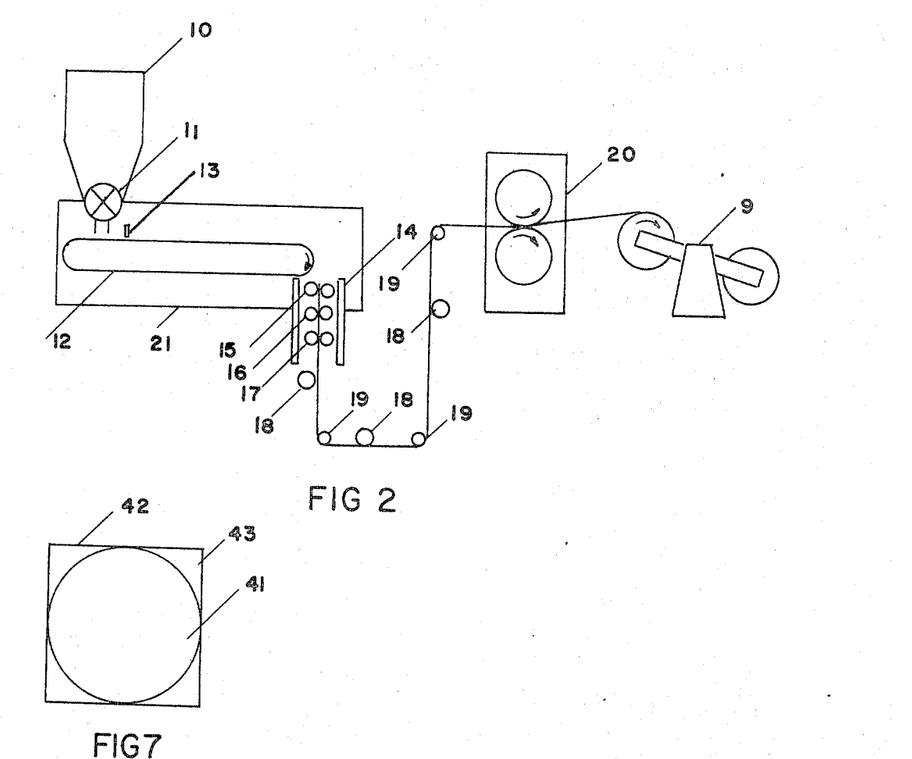
FIG. 2 is a schematic view illustrating a continuous process for producing thin gauge, low density sheeting by fusing a layer of low density foamed polystyrene powder in an oven to form a web and then treating the web in a roll type sheeting die to form a sheet.
FIG. 7 illustrates the savings in raw material which can be attained when using the process of FIG. 5 to make laminated molded articles.

In the continuous process of FIG. 2, foamable polystyrene powder having an average particle size generally in a range from about 1 to about 1000 microns and preferably in a range from about 10 to 250 microns is fed from a hopper 10 through a rotary air lock 11 onto a continuous belt 12 within an oven 21, wherein the powder is fused, foamed and expanded, forming a web. Temperature in the oven is established and maintained at about 225–250° F., for example. Thickness of the web, for example, is about 5–10 mils. The web is then fed to a set of motorized rolls 15 of a roll type sheeting die 14, wherein the web of fused powder is sheeted. A second set of motorized rolls 16 dimensions the sheeting. A third set of motorized rolls 17 is used as a second set of dimension rolls. The rolls 15, 16 and 17 run within the die as "bearings." Preferably the oven 21 and sheeting die 14 are enclosed and the ambient gas pressures therein are controlled by introducing nitrogen or other suitable gas therein to increase ambient gas pressures and by evacuating gas therefrom to reduce ambient gas pressures, whereby pore size and density of the sheeting produced is controlled. The temperature of rolls 15 is sufficiently high to compress the webbing. Rolls 16 and 17 are preferably cooler to set or solidify and harden, and cool the sheeting so that it emerges from the die shaped and cool. The sheeting thus obtained typically has a thickness, for example, of 1–5 mils.

The process schematically shown in FIG. 2 can be termed a powder-extrusion process because it is somewhat similar to the blown film extrusion procedure. In the blown film extrusion of low density polystyrene, foamable pellets are fed through a hopper in the extruder to the extruder proper, where heating and fusion to a homogeneous mass is performed. The pressure within the extruder prevents expansion of the mass. The mass is then shaped by the die and expansion occurs upon leaving the die. Density control is resctricted to controlling the temperature of the mass as it leaves the die. In the powder extrusion process the hopper 10 and air lock 11 serve to introduce the foamable or foamed powder into the pressurized oven 21. When using foamable powder the powder is fused into a web, the ambient pressure in the oven being selected to prevent expansion. This is comparable to the action in a blown film extruder. Both ambient pressure and temperature in the roll type sheeting die 14 of the instant process are selected to enable expansion to take place therein to the extent desired. That is a distinct advantage over the blown film technique where temperature is the only controlling factor that can be regulated. In addition, in the process of this invention the roll type die 14 does not create mass flow limitations imposed by the back pressure encountered with blown film extrusion dies. The range of throughputs is substantially greater with a powder extruder than with blown film extruders, since in a powder extruder a broad range of thicknesses can be accommodated at fixed high speeds, giving variable outputs, whereas a blown film extruder is limited by the homogenizing effect of the extruder screw. Normally the mass flow of an extruder is relatively dependent on the flexing action produced by the screw. With a die which produces thick gauge material, maximum throughput in mass is achieved. As the gauge of the material is reduced, using a smaller opening in the die, back pressure builds up and flow is somewhat reduced, even through line speeds of the blown film line are increased to accommodate the increased footage produced. The blown film process can therefore produce higher line speeds (30–100 feet per minute) with thin gauge material (10–20 mils), but with reduced mass throughput or low line speeds (15–30 feet per minute) with thicker gauge (20–80 mils) materials, with maximum throughput. Powder extrusion is not limited by this relationship. The layer of powder that is handled in the oven 12 is easily adapted to the roll type die opening so that thick or thin gauge webbing can be made using the same line speed with varying mass throughput. With thin gauge webbing infrared or radiant heaters 13 are preferably employed to heat the layer of powder foamed on the conveyor belt, and/or the supporting conveyor belt is heated to indirectly heat the layer of powder. With thicker webs, dielectric heating enables heat to be rapidly applied to the powder layer. Another advantage of the powder extrusion process is that multiple hoppers 10 can be employed, each with a different colored powder, to produce novel decorative designs, such as wood grain, etc., in low density sheeting. This cannot be done in conventional blown film extrusion processes.

Although polystyrene powder has been referred to in the description of the powder extrusion process of FIG. 2, other thermoplastic powders can be employed instead under the broader concepts of this invention.

In the process of FIG. 2, bowed rolls 18 are included in the processing line to smooth the sheeting as it travels from die 14 to windup section 9. Squaring rolls 19 are also included in the processing line to enable even edged rolls to be produced. A calender stack 20 preferably is present to provide a smoother surface and to give a more uniform thickness to the sheeting. In place of highly polished smooth rolls, embossing rolls can be used in the calender stack 20 to impart a configuration to the sheeting.

Figure 3:
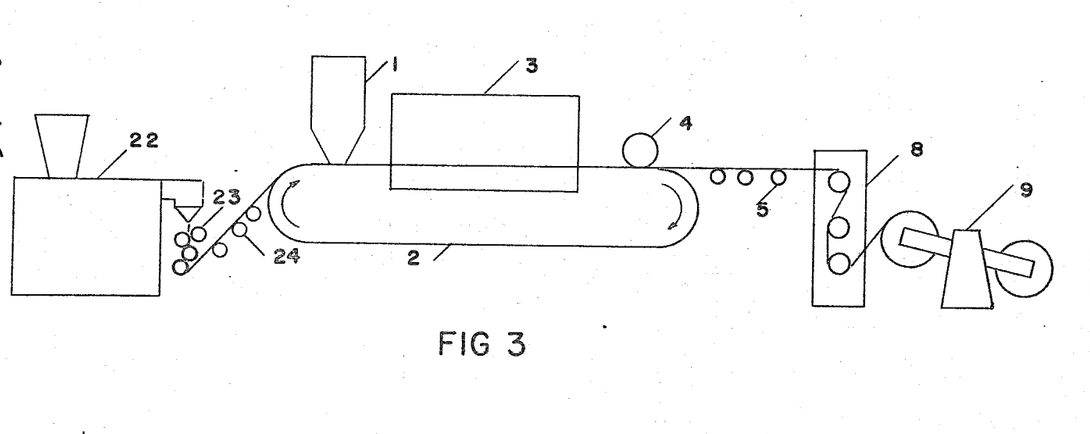
FIG. 3 is a schematic view illustrating a continuous process for producing a laminate of high impact polystyrene and low density thin gauge foamed polystyrene.

In the continuous process of FIG. 3 a laminate of low density, thin gauge foamed polystyrene and high impact polystyrene is obtained as follows. A sheet (for example, 5 mils thick) of high impact polystyrene, extruded from a conventional extruder 22 with a sheeting die and passed through casting rolls 25 to form the sheet, is guided onto a continuous, traveling belt 2 by means of guide rolls 24. A layer (for example, 10 mils thick) of low density, foamed polystyrene powder having a particle size generally in a range from about 1 to about 1000 microns and preferably in a range from about 10 to about 250 microns is formed on the sheet by deposition from hopper 1. It is preferred that the temperature of the sheet of the high impact polystyrene be still high enough so that the deposited powder will adhere to it. The sheet of high impact polystyrene with the layer of foamed low density polystyrene powder is then passed through a heating zone 26 where the powder is fused. Temperature of the heating zone is established and maintained for example at 225–250° F. On emerging from the oven the fused powder layer rapidly sets. The resulting lamination is removed from the continuous belt 2 with the aid of a vacuum transfer roll 4. The remainder of the processing line preferably if similar to the processing line in the process of FIG. 2 in which guide rolls 5, static eliminator unit 8 and windup unit 9 are utilized in addition to other auxiliary processing equipment.

Laminates of other thermoplastic sheets that are available for vacuum forming, and of powders composed of the same or different resins in expanded or expandable condition including the Microballoon particle form, can be made by the process of this invention. When the powder and sheet are composed of different resins a thin, mutual adhesive coating on the sheet is employed, if necessary, to obtain, or if desirable, to improve, adhesion of the powder to the sheet.

Figure 4:
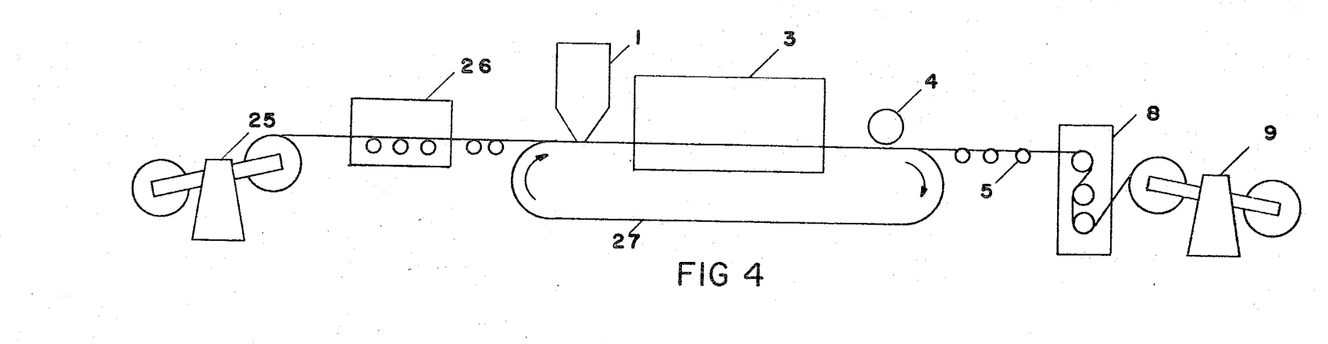
FIG. 4 is a diagram of a continuous process for producing laminates of low density, thin gauge foamed polystyrene and a porous substrate.

In the continuous process of FIG. 4 there is obtained a laminate of used low density foamed polystyrene powder and a porous substrate such as a fabric, paper or the like. In this process a web (for example, 5 mils thick) of porous substrate is removed from an unwind unit 25, passed through a preheater zone 26 to warm the web to powder adhesion temperature, and then onto a continuous belt 27 which travels through an oven 3 established and maintained at a temperature, for example, 225–250° F. A layer (for example, 40–70 mils thick) of foamed low density polystyrene powder from the powder applicator 1 is formed on one side of the porous substrate ahead of the oven 3. Within the oven the powder is fused and vacuum is applied to the other side of the porous substrate to improve the bond between the substrate and the fused powder. Auxiliary equipment preferably is used to process the resulting lamination after it leaves the oven, which equipment preferably includes a vacuum transfer roll 4, guide rolls 5, static eliminator unit 8 and windup unit 9.

In conventional vacuum forming processes where laminates of foamed polystyrene and high impact polystyrene are vacuum formed, the time to heat the material, form it in the mold and cool it in the mold, is disproportionately high on a square footage basis when compared to the high output rates available in normal extrusion or calendering operations. The commonly employed technique of laminating polystyrene foam to high impact polystyrene as the high impact polystyrene is extruded afford certain economies in production. However, the non-oriented polystyrene foam commercially available, as produced by the blown film process is produced at relatively low production rates due to the nature of the process. Furthermore, the density of the commercially available foamed polystyrene webbing is higher than that obtainable by the process of this invention.

When producing circular articles such as pie plates, etc., from laminates of, for example, foamed polystyrene webbing and high impact polystyrene by conventional techniques of vacuum forming, considerable wastage of material occurs because, as depicted in FIG. 7, what is obtained thereby is a vacuum formed laminate 42 with the circular article 41 formed therein and with undesired portions 43 which ultimately have to be removed. In the vacuum formed laminate 42 the circular article 41 occupies less than 78.5% of the area of the laminate. Therefore, there are 21.5 pounds of foamed material wasted for each 78.5 pounds of foamed material used. A like amount of high impact polystyrene is wasted. Because the waste laminate cannot be reused readily without the risk of contaminating the material to which it is added, because its value as scrap is low and because of the need to remove the undesired portions 43, conventional vacuum forming processes leave something to be desired as far as economical usage of raw materials and efficiency are concerned. In processes of this invention hereinafter described, wastage of foamed material is reduced to zero and the high impact polystyrene that is reclaimed is uncontaminated by foamed polystyrene so that the reclaimed high impact polystyrene can be readily reused and thereby afford a highly economical process from a raw material point of view.

Figure 5:
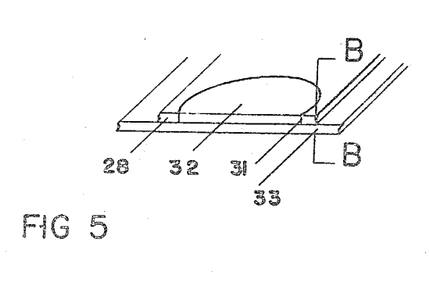
FIG. 5 presents three schematic views illustrating a continuous process for producing shaped articles from high impact polystyrene and low density foamed polystyrene powder.

In the continuous process of FIG. 5 a sheet of high impact polystyrene, for example, formed by extrusion from a conventional extruder 22 and passage through a sheeting die and casting rolls 23, and preferably warm enough for polystyrene powder to adhere to it, is led by guide rolls 24 onto a continuous traveling belt 2 associated with a special powder applicator which deposits on the sheet foamed polystyrene powder in an area of desired configuration or outline, for example, a circle. Typical thickness of the sheet is 1–5 mils and typical thickness of the powder, having a particle size in a range from about 10 to about 250 microns, is 40–70 mils. The sheet of high impact polystyrene with deposited powder thereon is, if the heat of the sheet does not cause fusion of the deposited powder, exposed to auxiliary heaters 34 until fusion does occur. The sheet with the fused powder thereon is passed to a conveyorized heated vacuum forming mold 35 in a heated mold zone, where vacuum forming of the article takes place. The article, still attached to the sheet, is then transferred to a mold 36 which conveys the molded article from the heated mold zone to a conveyorized cooling mold 37 in a cooling zone, and cooled. Economies in thermal energy are realized by the use of conveyorized heating molds 35, conveyorized transfer molds 36 and conveyorized cooling molds 37. In this process the heated molds are always hot while the cooling molds are always cool. The only energy required to heat the heated molds is that required to compensate for the energy absorbed by the articles. The only energy required to cool the cooling molds is that required to compensate for the energy absorbed from the articles. The energy requirement of the process, therefore, are substantially lower than those required in conventional molding techniques where molds are cyclically heated and cooled, and the major energy consumed is in heating and cooling the masses of the molds, which is disproportionately large in comparison to the masses of the molded articles.

The cooling molds 37 also remove excess high impact polystyrene as a continuous die cut web for easy recovery. Ejection of the cooled molded articles onto a conveyorized belt 39 traveling at 90° to the production line removes the articles and the cooling molds 37 return for more articles.

The special powder applicator in the process of FIG. 5 comprises a continuous template 28 of flexible sheet material such as silicone rubber or the like having openings or apertures 31 conforming to the desired plan view shapes of the articles to be molded. The continuous template is moved in place by motorized rolls 30 at the same speed as the sheet of high impact polystyrene. Powder 32 is applied by a powder applicator 29 to the sheet of high impact polystyrene 33 which is arranged so that the thickness of the deposited layer of powder is substantially the thickness of the template 28.

Figure 6:
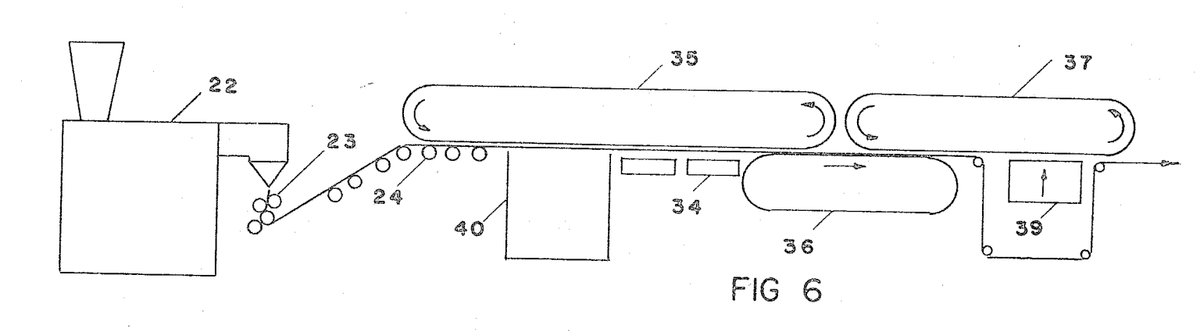
FIG. 6 is a diagram of another continuous process for producing shaped articles defined by laminates of low density thin gauge foamed polystyrene and high impact polystyrene.

The continuous process of FIG. 6 is useful for making shaped articles with deep cavities, that is, cavities having depths substantially greater than their average effective diameters (average effective diameter is equal to the square root of the dividend of the average cross-sectional area divided by 1.27). Such articles are referred to herein as deep drawn articles. Conventional vacuum forming of the articles from laminates of high impact polystyrene and foamed polystyrene is generally limited to articles with cavities having a depth equal to or slightly greater than their average effective diameters, and thinning of the foamed layer occurs as it is stretched. Deep drawn articles made by the process of FIG. 6 have uniform wall thickness of wall material and, moreover, the foamed material layer can be obtained at densities less than heretofore obtained. In the process of FIG. 6, a sheet (thickness, for example, is 1–5 mils) of high impact polystyrene formed by extrusion from a conventional extruder 22 with a sheeting die and casting rolls 23 is led while still hot by guide rolls 24 into a vacuum forming zone. In that zone the sheet is vacuum formed in conveyorized molds 35 into shells having the shapes of the deep drawn articles. The molds 35 are two-piece molds, each having an upper piece and a lower piece. With the hot vacuum formed shells retained, as by applying vacuum thereto, in the upper pieces, the lower pieces are removed by a conveyor and the upper pieces are conveyed into a powder sprayer 40 wherein foamed polystyrene powder (having particles size, for example, of 10–250 microns) is sprayed upwardly onto the exposed portions of the hot shells to desired depths (for example, 40–70 mils), which portions can be either the outsides or the insides of the shells, depending on whether the upper pieces of the molds are the male or female pieces, and this is determined by what is desired in the resulting article. If residual heat in the shells is not sufficient to fuse all of the foamed powder on the shells, auxiliary heaters 34 can be used to accomplish this. Thereafter, the resulting articles are placed into transfer molds 36 and conveyed into a cooling zone wherein they are removed from the transfer molds and placed into conveyorized cooling molds 37 in a cooling zone. The transfer molds 36 in this process have a dual function—to dimension the shaped articles and to transfer the molded articles to the cooling molds 37. The cooling molds separate the articles from the remainder of the sheet of high impact polystyrene and cool the separated articles. As in the process of FIG. 5, cooled articles are ejected onto a conveyor belt 39, and scrap high impact polystrene is reclaimed.

Figure 8:
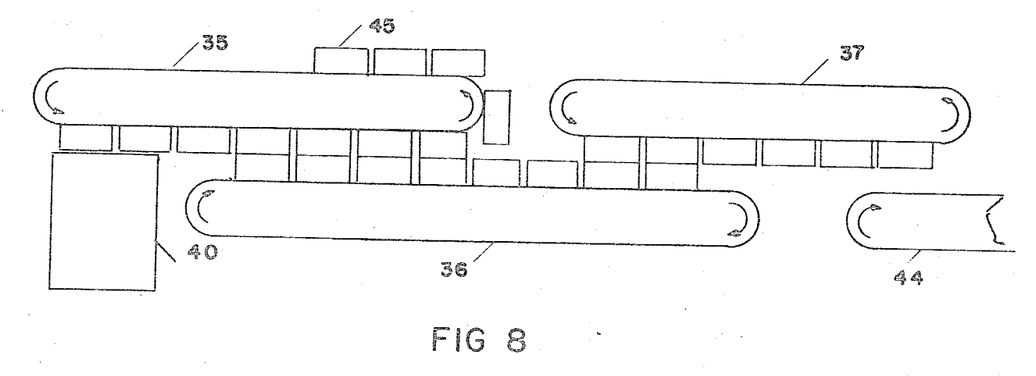
FIG. 8 is a diagram of a process of this invention for making thin gauge, low density molded polystyrene articles from foamed or heat foamable polystyrene powder with the aid of porous molds.

In the continuous process of FIG. 8, internally heated, open, porous (gas permeable, powder impermeable), hot molds 45 on a continuously moving conveyor 35 in a hot zone are conveyed into a powder sprayer 40 with the open sides of the molds facing downwardly. Vacuum is applied to the top sides of the molds and expanded, foamed polystyrene powder (average particle size, for example, is in a range from about 10 to about 250 microns) is sprayed upwardly onto the molds, forming a shaped layer of substantial thickness, such as, for example, 40–70 mils. The molds 45 at powder fusing temperatures, for example, 225–250° F., are conveyed out of the powder sprayer while the powder layers therein become fused. After fusion takes place application of vacuum to the molds is discontinued and compressed air is applied to the mold tops to "pop" or expel the fused layers, now shaped articles, into porous, open top, subjacent transfer molds on a conveyor 36 which moves from the hot zone to a cooling zone. The transfer molds assist in dimensioning the molded articles. In the cooling zone compressed air is applied to the bottom sides of the transfer molds to expel the still hot articles into porous open bottom, superjacent cooling or cold molds on a conveyor 37 while vacuum is applied to the top of the cold molds to maintain the shaped articles in the cooling molds during their travel through the cooling zone. When the shaped articles have cooled to desired temperatures, application of vacuum to the cooling molds is stopped and compressed air applied to eject the cooled, shaped articles onto a take-off belt 44 for further processing or packaging.

Because powdered polystrene can be charged electrostatically, in the foregoing processes depicted by FIGS. 1–8 the low density foamed polystyrene powder can be held to electrically chargeable mold or conveyor belts by electrostatic forces instead of by pneumatic forces (vacuum). However, in those processes wherein laminates of high impact polystyrene sheeting and fused expanded polystyrene powder or of a resin sheeting and other electrostatically chargeable thermoplastic resin powder are made, for example, the process of FIG. 6, the powder preferably is electrostatically deposited in one mold piece, either the male or female mold piece, the sheet is vacuum formed in a mating mold piece, either the female or male mold piece, and with powder layer and vacuum formed sheet retained in the mold pieces, the mold pieces are brought together for adhering the powder layer to the vacuum formed sheet and, if fusion of the powder prior to bringing the mold pieces together was not done, for fusion of the powder layer.

Also, direct and indirect heating of the powder layers by infrared radiation, radio frequency or induction, and the like are within the concepts of this invention.

Of course, to repeat, the concepts of this invention are applicable to thermoplastic resin powders and sheeting other than polystyrene powder and sheeting. This is exemplified by the continuous process carried out in the apparatus 51 of FIGS. 9–13 for the production of low density molded articles of polyethylene, using vacuum deposition to apply the foamed, low density, polyethylene resin powder to the mold and using internal induction heating of the mold as well as internal infrared heating to fuse the powder particles.

In the apparatus 51 of FIGS. 9–13, male fusion molds 53 having a gas permeable, powder impermeable face pieces 55 and carried by a continuous, traveling chain conveyor 57 are transported face down into a fluidized bed powder applicator 59. Polyethylene powder (average particle size, for example, being 10–250 microns) in fluidized bed 61 in the applicator collects in a layer (for example 40–70 mils thick) on the face piece article shaping surface 63 by applying vacuum to the interior surface 65 of each face piece, and because of heat from the induction heat element 67 (see FIG. 13) within the face pieces 55. The powder adheres only to the porous surface 63 of the male mold 53. Any surfaces that are masked or not porous do not collect powder. Excess powder falls back into the fluidized bed by gravitational forces. The thickness of the coating is governed primarily by the degree of vacuum employed and secondly by the temperature of the face piece surface 63. Without vacuum temperature of the surface 63 is established and maintained at 450–500° F., which results in the adherence of room temperature polyethylene powder by standard fluidized bed coating procedures. At lower temperatures, for example, 150–200° F., in conjunction with vacuum, greater control of processing variables and product quality is attained when using foamed polyethylene powder. Consequently, vacuum and lower temperatures are preferred.

Figure 9:
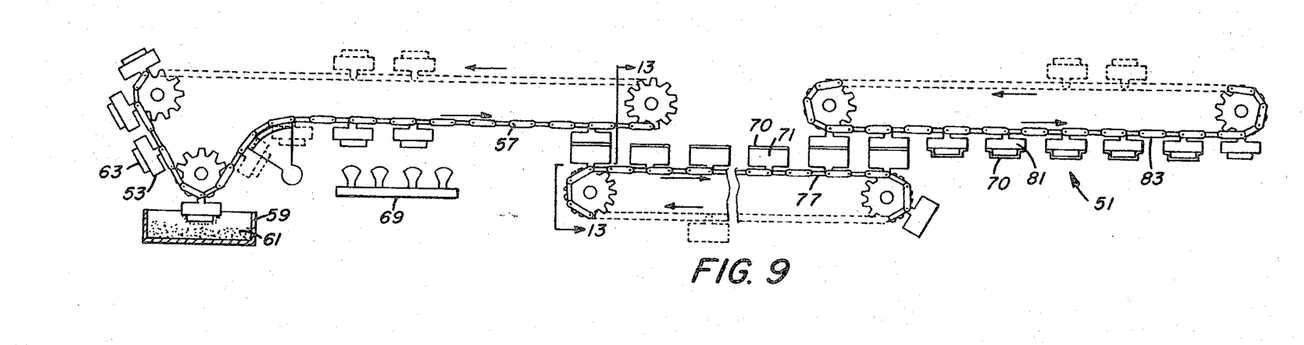
FIG. 9 is a partially diagrammatic side view of a preferred specific embodiment of an apparatus for carrying out a continuous process of this invention, in which apparatus there takes place the transfer of a hot article from a hot mold in a hot zone to a transfer mold and the transfer of the hot article from the transfer mold to a cooling mold in a cooling zone.

The coated male fusion molds 53 are conveyed by the chain conveyor 57 out of the fluid bed applicator 59 into and through a heating zone wherein infrared heat from infrared radiator 69 fuses the foam powder to continuous masses, forming hot articles 70.

Figure 10:
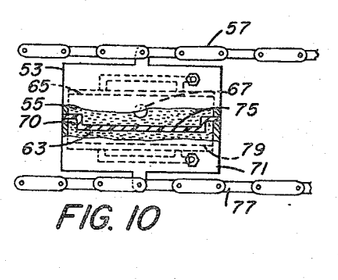
FIG. 10 is an enlarged view of a hot mold mated with a transfer mold, in which view portions of the mold have been removed to reveal inner structure as well as the hot article.

The male fusion molds 53 are then carried out of the heating zone and mated with female transfer molds 71 having gas permeable or porous female face pieces 73 with shaped article surface 75 conforming to the article shaping surfaces 63 of the male face pieces 55. The female transfer molds 71 are carried by a chain conveyor 77 which is positioned so that the shaped article surfaces 75 of the female face pieces 73 face upwardly when brought into article receiving position relative to the male mold face pieces 55. When mating occurs the vacuum applied to the interior surfaces 65 of the male face pieces 55 is discontinued and compressed air applied instead. At the same time vacuum is applied to the interior surfaces 79 of the female mold pieces 73 and the hot articles 70 are transferred into the female transfer molds 71.

As the male fusion molds 53 without the hot articles 70 continue their travel on the chain conveyor 57 away from the female transfer molds 71, compressed air to the male fusion molds 53 is discontinued and preferably as or after the male fusion molds 53 enter the powder applicator 59, vacuum is applied to the interior surfaces 65 of the male mold face pieces 55.

Figures 11, 12:
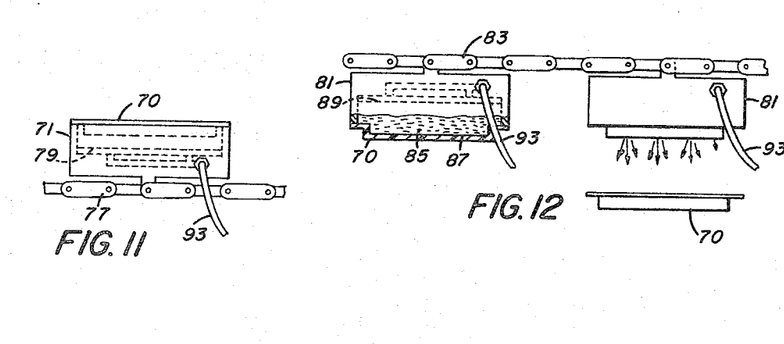
FIG. 11 is an enlarged view of a transfer mold of the apparatus of FIG. 9.
FIG. 12 is an enlarged side view of a back end portion of the cold zone of the apparatus of FIG. 9, which view shows in greater detail two cold molds with exterior structure of one of the molds removed to reveal interior structure, including a cooled article.
Figure 13:
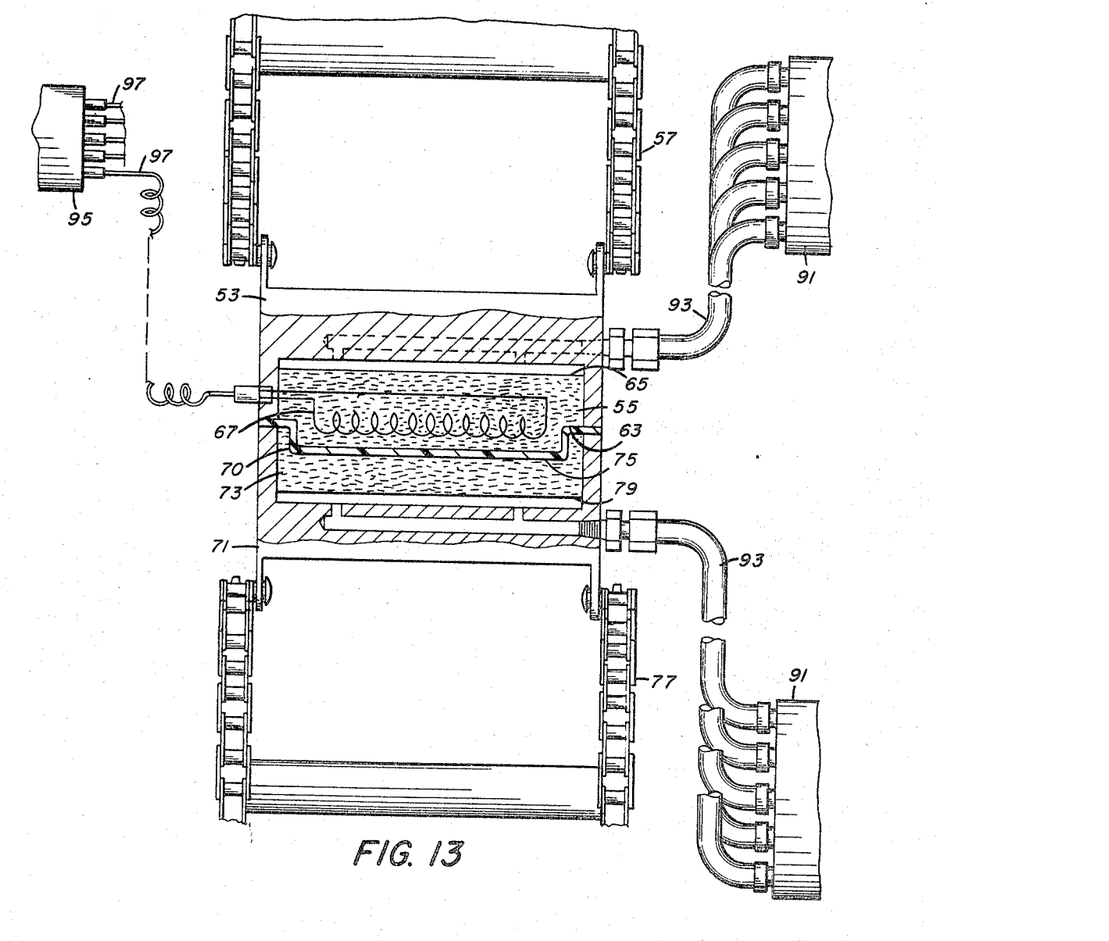
FIG. 13 is a cross-sectional view of the apparatus of FIG. 9, which view has been taken as indicated by the offset sectioning plane 13—13 in FIG. 9 and which shows portions of the apparatus not shown in FIG. 9.

Meanwhile, the female transfer molds 71 with the hot articles 70 in place and with or without, as desired, the application of vacuum are conveyed by the chain conveyor 77 into a cooling zone. Here the female transfer molds 71 mate with male cooling molds 81 carried by a chain conveyor 83. The male cooling molds 81 is this embodiment are similarly constructed to the male molds 53, having porous face pieces 85 with open shaped article surfaces 87 conforming to the shaped article surfaces 75 of the female face pieces 73 and facing downwardly at the time of mating. In addition the porous face pieces 85 have interior surfaces 89 to which vacuum is applied at the time of mating of the male cooling molds 81 with the female transfer molds 71, and, if desired, internal cooling liquid coils. At the time of mating compressed air is applied to the interior surfaces 79 of the female face pieces 73 and the still hot shaped articles 70 are transferred to the male cooling molds 81. After transfer has been effected compressed air to the female molds 71 is discontinued and the female molds are returned by the transfer chain conveyor 77 to receive more hot articles.

The male cooling molds 81 with shaped articles 70 and with vacuum still being applied for cooling and for article retention purposes are conveyed by the chain conveyor 83 until the desired extent of cooling has occurred. At this stage compressed air is applied to the interior surfaces 89 and the now cooled articles ejected from the male cooling molds 81 as shown in FIGS. 9 and 12.

The various pneumatic conduits and cooling liquid conduits required by the molds are connected to headers utilizing rotary joints where needed. See FIG. 13 which shows pneumatic headers 91 with flexible conduits 93 to each of the fusion molds 53 and an induction heating current header 95 with conductors 97 to each of the molds 53. Flexible connections prevent stresses from being introduced in the conduits and conductors, and accommodate the varying distances encountered from the headers to the moving molds during travel of the molds in their endless paths. The path traveled by a single mold can be substantially that of a merry-go-round, if the path is essentially horizontal, or can be of a ferris wheel with the molds travelling vertically, or it can be like a race track. The choice of path is dictated by floor space and head space considerations as well as mold sizes and shapes. In some cases, combinations of the various paths yield optimum results. In any process the molds must be permitted to travel at a speed and in a path to accommodate the function being performed, whether it be filling, heating or transferring of articles.

In using dielectric heating during the powder fusion process with polar resins such as, for example, polyvinyl chloride, it is preferable, when producing molded articles to employ a non-polar material for the shaped article forming surfaces on which the powders are deposited. Examples of non-polar material which can be used for this purpose are polypropylene, polyester and polytetrafluoroethylene resins. When pneumatic means of filling the molds are to be employed as in the embodiment of FIGS. 9-13, the non-polar, mold face piece is preferably made of sintered polytetrafluoroethylene resin and is gas permeable. The powder to be molded is applied from a fluidized bed to the sintered face piece using vacuum on the interior surfaces of the face piece, which effectively provides suction at the shaped article forming surface on which the powder is deposited. The male mold with porous face piece is then transported from the powder deposition zone and a matching non-porous polytetrafluoroethylene resin mold face piece is mated with the male face piece. The combination of male face piece, coating of powder polyvinyl chloride and female face piece is now carried as a sandwich by the male mold. The entire sandwich is transported to the fusion zone where dielectric heating on a continuous basis fuses the powder to a molded, polyvinyl chloride article.

With dielectric heating, the non-polar, mold face pieces are not heated to any significant degree, and any heating of the face pieces is by conduction from the molded articles. The sandwich of face piece and molded article is now transported to the cooling zone. Several methods of cooling the face pieces have been found effective where the articles molded are not affected by water. The face pieces can be chilled by spraying with refrigerated water. Where dry articles are preferred, the face piece sandwich with article are mated top and bottom with male and female face piece cooling carriers respectively, and cooled. In removing the cooled article from the face pieces, the bottom female face piece is separated mechanically with the female face piece cooling carrier, while the article and porous male face piece are transported to the article recovery area, and the article is discharged from the male face piece by compressed air. After the article has been removed from the porous male face piece pneumatically, the face piece is mechanically separated from the male face piece cooling carrier and returned to the location in the processing line where the cycle is repeated. Preheating of the male face piece, before it arrives for reuse is accomplished by hot water sprays, induction heating, submerging in hot water tanks, infrared lamps, etc., depending on the thickness of the face piece and the availability of heating services.

Figures 14, 15, 16, 17:
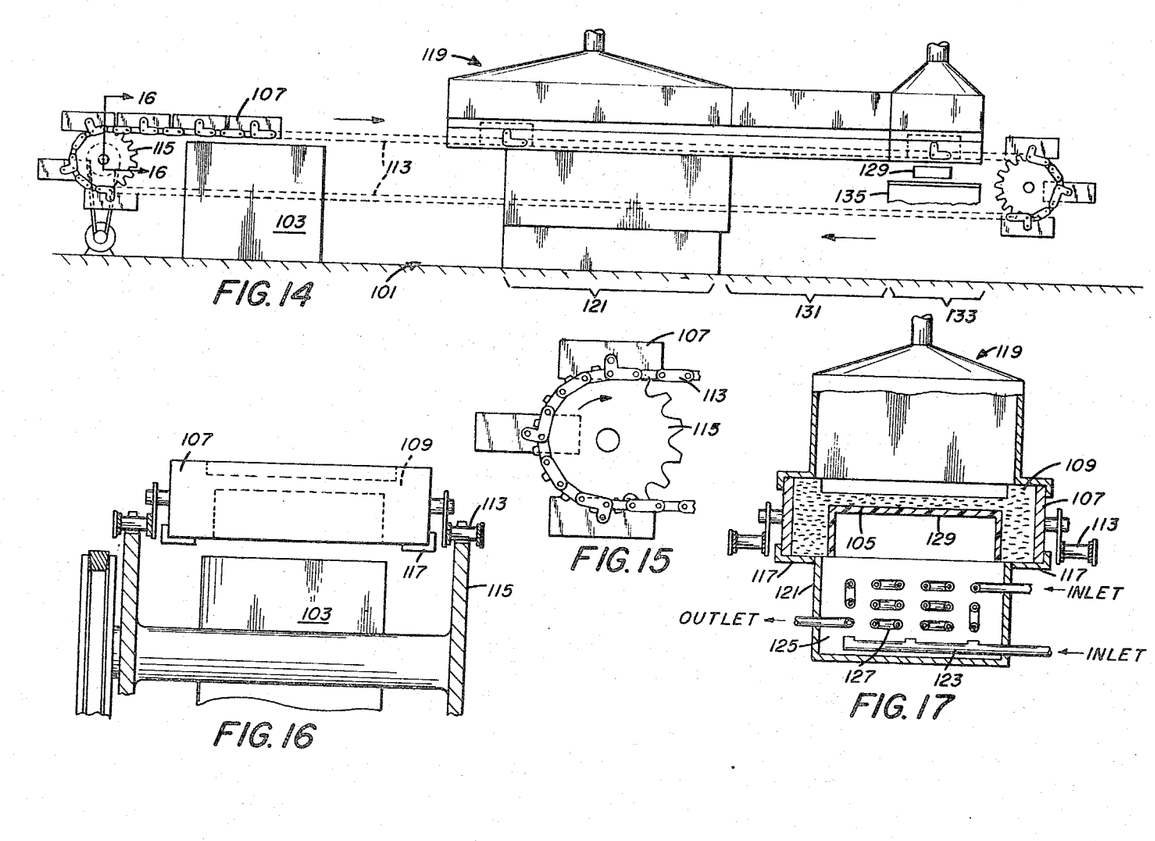
FIG. 14 is a partially diagrammatic side view of a preferred specific embodiment of another apparatus for carrying out still another continuous process of this invention.
FIG. 15 is an enlarged view of a portion of the front end of the apparatus of FIG. 14.
FIG. 16 is a cross-sectional view of the front portion of the apparatus of FIG. 14, which view has been taken as indicated by the offset sectioning plane 16—16 in FIG. 14.
FIG. 17 is a cross-sectional view of the vacuum station and fusion zone portions of the apparatus of FIG. 14, which view has been taken as indicated by the sectioning plane 17—17 in FIG. 14.

In another continuous process aspect of this invention a gaseous fluid, for example, air, steam or both air and steam, is used to fuse layers of low density powders into shaped articles. The apparatus 101 of FIGS. 14–17 is employed in the practice of a specific embodiment of this process. In this embodiment expanded, acrylonitrile-butadiene-styrene resin (the monomeric units of the resin being present in about a 1:1:1 weight ratio) powder (average particle size being in a range from about 10 to about 250 microns, for example) is applied electrostatically as by a conventional electrostatic powder applicator 103 to downwardly facing, shaped article forming surfaces 105 of molds 107. The shaped article forming surfaces 105 are provided by porous (gas permeable, powder impermeable) sintered metal mold pieces 109 which are open on top and bottom and bounded laterally by rectangular walls 111 of non-porous metal of the same normally vertical dimension. The molds 107 are connected to traveling, continuous chains 113 carried by chain sprocket wheels 115, which slide the molds in abutting relationship on angle bar rails 117 from one station or zone to the next, and which return the emptied molds 107 from the end to the beginning of the apparatus 101. When the powder applied electrostatically has collected into a layer of desired thickness (for example, in a range of 40–70 mils) on the shaped article forming surfaces 105 the mols 107 leave the powder applicator 103 and enter a vacuum station 119 where vacuum is applied to the tops of molds. This draws air up through the molds 107, which assist in compacting to the extent desired the powder layers on the shaped article forming surfaces 105. The molds 107 then pass into the fusion zone 121 of the vacuum station 119 wherein the open bottoms of the molds 107 are exposed to superheated steam obtained by introducing steam from steam jets 123 into a laterally confined space 125 below the molds 107 on the rails 117, in which space there are preferably heating coils 127 with circulating heating fluids. Because of the application of vacuum to the open tops of the molds 107, superheated steam plus air, if the bottom of the space 125 is open as in FIG. 17, is drawn up through the molds 107 including the powder layers on the shaped article forming surfaces 105, whereby the powder layers are sintered to coherent masses, followed by flowout of the ABS resin into non-porous masses of low density, whereby shaped articles 129 are formed. By controlling the periods of time the molded articles 129 are in contact with steam, temperature of the steam, and the flow rates of steam through the molds 107, a skin of higher density can be developed, if desired, on the bottom surfaces of the molded articles. The molds 107 thereupon pass from the fusion zone 121 of the vacuum station 119 into the cooling zone 131 of the vacuum station. In the cooling zone 131 application of vacuum to the article ladened molds 107 is continued to hold the articles 129 in place in the molds and to assist in cooling them. If desirable, cooled air can be blown on the bottoms of the molds 107 in their travel through this zone. The molds 107 are moved out of the cooling zone 131 of the vacuum station 119 into a molded article discharge station 133 which, if desired, can have means for applying compressed air to the tops of the molds 107 to eject the molded articles 129 therefrom. A molded article conveyor 135 such as a chute, belt conveyor or the like is positioned to receive the molded articles 129 ejected from the molds 107.

In the embodiment of FIGS. 14–17, as in standard fluidized bed procedures, temperature of the molds 107 when applying the powder determines to a degree the thickness of the powder layer and subsequently the degree of flowout as well as the amount of postheating, if any, required. Because low density resin materials are in general excellent thermal insulators, heating of the fused, low density article past the cohesion point results in a further softening initially at the surface only of the article. Instead of passing the molds 107 from the fusion zone 121 to a cooling zone 131, the molds can be passed directly to a transfer zone and the hot molded articles transferred to transfer molds (in this case male molds), of smooth non-porous material to dimension the molded articles and compact the softened outer layers to denser continuous skins, giving wall structures similar to laminates of high density and low density materials, and thereafter the molded articles are cooled either in the transfer molds, or, after transfer from the transfer molds, in cooling molds.

In the embodiments of FIGS. 14–17, in place of electrostatic deposition of the expanded powder onto the conductive porous mold pieces, the powder can be applied pneumatically onto sintered polytetrafluoroethylene mold pieces. In this connection, in preparing molded low density articles, the choice of mold construction depends on various factors, one of which is the economic factor. When the molded shaped article is in the medium to high density range for expanded resins, for example, 15–50 pounds per cubic foot, articles having thicknesses in a range from about 0.1 to about 0.3 inch generally have adequate strength to be removed from the molds by means well known in the injection molding and compression molding arts, such as, for example, knock-out pins, air jets, mechanical fingers, etc. When maximum handling ease and separation of articles from the molds are required, particularly with thin gauge, low density articles in the 1–5 pounds per cubic foot density range with molded thicknesses of 0.015–0.1 inch, porous mold pieces made as follows are preferred. The shaped article forming faces of sintered metal mold pieces having relatively large pore sizes such as, for example, 10 microns, for use in conjunction with powders of 20 microns and larger particle sizes, are sprayed with a dispersion of a fluoro-carbon resin such as a polytetrafluoroethylene resin or the like, having particle sizes in a range from about 0.1 to about 0.25 micron. The mold piece is supported horizontally, sprayed side down, and air of low pressure and flow rate is passed through it while the sprayed resin is fused to the sintered metal. In this manner a suitable porous mold piece having desirable porosity and release properties is obtained.

Another technique of producing foraminous mold pieces employs wire mesh, shaped to the desired article forming surface contours and affixed to a supporting member containing a plurality of holes. The combination is coated with a fluorocarbon resin such as a polytetrafluoroethylene resin, and the coated structure treated as above.

Although the present disclosure up to this point has dealt primarily with the processing of expanded or expandable powders to low density articles, concepts of this invention involved in molding low density articles are also applicable to molding nonexpanded or nonexpandable resin powders. Thus, the transfer mold aspect of this invention, that is of heating molds, transfer molds and cooling molds, is applicable to resinous materials in physical forms other than powder forms. The goal of this aspect is to keep the hot mold always hot and the cold mold always cold with the transfer molds being neither deliberately heated nor cooled, but serving merely to transport hot molded articles from the hot molds to the cold molds. If the cooling of the cold molds normally requires greater time than the normal heating sequence, a ratio of the number of molds in the cooling zone to the number of molds in the heating zone is used, which corresponds to the ratio of the cooling time to the heating time. In this manner a balanced line, timewise, is achieved because the mass flow past any point in the heating zone equals the mass flow of articles past any point in the cooling zone.

Mold constructions used in carrying out the mold transfer aspect of this invention include conventional two-piece molds as well as three- and four-piece molds. The mold faces which shape and come in contact with the molded articles can be porous for vacuum filling of the mold, for pneumatic transfer of the articles from heated molds to cooling molds, and for gaseous fluid heating of the resin material as for example in steam chest molding. In electrostatic deposition of powder on mold faces, conventional metal mold faces (non-porous) are preferred, although any mold face which is electrically conductive, whether porous or non-porous, can be used, including plastic mold faces which contain metal filler material or graphite material in sufficient proportions to be substantially electrically conductive.

When dielectrically heated molds are employed, mold facings of polypropylene, polyester, polytetrafluroethylene and the like resins, which have low radio-frequency loss, are preferably used. In infrared heating, mold face pieces are preferentially made of metal coated with black material to absorb the infrared heat on the side opposite to that in contact with the powder layer or article. In induction heating of molds, thicker mold pieces are preferably used to enable the radio-frequency unit to induce adequate eddy currents for the desired heating effect.

The transferring of molds, or mold face pieces, from heating zone to cooling zone can be accomplished by mechanical, pneumatic or electromagnetic means. Combinations of these means can be employed in a single process line.

Another important aspect of this invention is that of a removable mold face having an article shaping male side and an article shaping female side. These sides face in opposite directions with the article shaping contours of one being inversions of the article shaping contours of the other side. By stacking between two face piece carriers three or more of these removable face pieces with male side to female side and with thermoformable resin material between the adjacent sides, two or more shaped articles can be formed at the same time in a heating zone. In addition, the stack of movable face pieces can be removed from the carriers, placed on transfer carriers, conveyed to a cooling zone and placed in cooling zone carriers, thereby enabling the molding process to be continuous.

The face pieces are of adequate strength and, therefore, of thickness to withstand handling and to maintain their dimensions. They, however, are as thin as practical in order that the heat transfer requirements can be held to a minimum. The face pieces can be made from metal filled epoxy resins, cast aluminum and slush cast low melting alloys. In one method of manufacturing the face pieces, electroforming is utilized for the two surfaces which can be then combined with metal filled epoxies. Silicone rubber molds can be used in conjunction with a master die to produce both the male and female surfaces, in which case an inverse or negative mold of silicone rubber is made from the initial silicone molding. Electroforming against these two surfaces gives smooth, hard mold face surfaces which can be combined with the metal filled epoxies. Aluminum foundry techniques using sand molding and cope and drag methods have been utilized to produce aluminum mold pieces of about one-half inch thickness and having inverse top and bottom surfaces. Using a master pattern, matching male and female master mold pieces which have been displaced an amount equal to the thickness of the face piece to be cast enable flowable materials to be introduced to the space between the male and female master pieces, thereby enabling a face piece having conforming top and bottom surfaces to be produced.

In one embodiment of the mold face piece aspect, male and female face pieces are incorporated in carriers utilizing fluid means to prevent the face pieces from deforming due to expansion of resin material between the face pieces during processing. This enables thinner face pieces to be employed so that stamped metal shapes are practical with proper process control.

In one mold face piece construction of this invention there is a male face piece and a female face piece. The male face piece has outwardly extending tabs which extend beyond the male face piece carrier when seated therein. The tabs, called male tabs, are preferably about one-half the width or less of the carrier wall and in opposing relationship to male tab engaging and disengaging holders which function are either mechanically or electromagnetically, and which are located on the male face piece carrier walls. The female face piece has similar tabs, called female tabs, which are in non-alined relationship to the male tabs when the face pieces are mated. The female tabs are in opposed relationship to tab engaging and disengaging holders on the male mold face piece carrier walls. When the female tabs are engaged by the holders on the male face piece carrier both the face pieces are retained in mated position and are secured to the male face piece carrier. When just the male tabs are engaged by the holders with the female tabs disengaged from the holders, only the male face piece is secured to the male face piece carrier. The female face piece carrier in this embodiment can also be equipped with holders if desired, but such is not necessary in this embodiment because transfer control can be effected with proper sequencing of the holder movements, utilizing gravity to retain the face pieces on the female face piece carrier. Of course, the female face piece carriers can have the holders instead of the male face piece carrier and gravity can be relied upon in transferring operations to retain the face pieces on the male face piece carrier.

In another continuous process embodiment of the removable mold face piece aspect of this invention powdered thermoformable, polar resin material is deposited by electrostatic deposition on one of the male and female mold face pieces seated in its hot zone carrier, the face pieces are mated and the resin sandwiched in between them is heated dielectrically until fusion occurs. The sandwich structure of face pieces and fused resin material between them is transferred to a transfer carrier, conveyed thereby out of the hot zone to a cooling zone, and transferred to a cooling zone carrier maintained at a substantially lower temperature to enable rapid cooling to be attained. Here again the use of transfer carriers gives maximum thermal economy, because the carriers in the hot zone are always hot, while the carriers in the cooling zone are always cool, and are not required to go through a cooling and heating cycle.

In one continuous process embodiment of the removable mold face piece aspect of this invention, preforms of fiber glass prepared by spray-up techniques and other techniques well known in the art are placed in the female face pieces. Resin is applied to the preforms as by spraying, rolling, brushing or other techniques. The combinations of fiber glass and resin can be applied simultaneously to the female face pieces by the well-known chopped-strand, spray-up technique using a spray gun which delivers chopped fiber glass and catalyzed resin simultaneously. The male face pieces are now mated with the filled female face pieces and the resulting sandwich structures are placed in conveyorized, face piece carriers heated either with steam heat or electrical heating elements. Upon completion of the heating cycle, the sandwich structure is removed from the heated carrier and transferred as by conveyorized transfer carriers to conveyorized cooling face piece carriers where the sandwich structures are cooled sufficiently to be removed from the cooling carriers and the face pieces separated from the shaped articles which are further processed or stored, as desired. It is to be noted, that the heated carriers remain hot, while the cooling carriers remain cool, thus conserving thermal energy and attaining maximum processing speeds. The transfer carriers, being neither deliberately heated or deliberately cooled, but serving to transfer the sandwich structures containing the molded articles from the heating zone to the cooling zone, can be of similar construction as the heating and cooling carriers, or can be simply moving jigs which are holders for the sandwich structures.

It is seen from the foregoing disclosure that the objects and purposes of the invention are well fulfilled. It is to be understood that the disclosure is given by way of illustrative example only, rather than by way of limitation.

What is claimed is:

1. A continuous process for making a plurality of shaped articles from synthetic resin material that can be heated in mold means to form a shaped article and then cooled in mold means, which comprises: moving a plurality of hot mold means for said articles from a filling station through a heating zone to a first article transfer station and back to said filling station without intentional intermediate cooling; moving a plurality of transfer mold means from said first transfer station to a second transfer station and back to said first transfer station; moving a plurality of cooling mold means from said second transfer station through a cooling zone to a discharge station and back to said second transfer station without passing into said heating zone; introducing said material into said hot mold means at said filling station; adding heat to said hot mold means during its travel through said heating zone sufficient for said material therein to take a form determined by the shape of said hot mold means; transferring at said first transfer station while still hot said shaped articles from said hot mold means to said transfer mold means, so that the transferred articles may be subsequently cooled in said cooling zone without requiring said hot mold means to enter said cooling zone; transferring at said second transfer station said shaped articles from said transfer mold means to said cooling mold means; removing heat from said cooling mold means in said cooling zone sufficient to substantially cool said shaped articles; and removing at said discharge station the cooled shaped articles from said cooling mold means.

2. A continuous process according to claim 1 wherein said hot mold means comprise hot vacuum forming molds, said synthetic resin material is introduced into each of said molds as a portion of a continuous sheet of thermoplastic resin material with a fused, foamed powder layer of a thermoplastic resin on said portion, and the shaped articles formed in said hot vacuum forming molds are separated from said sheet at one of said transfer mold means and said cooling mold means.

3. A continuous process according to claim 2, wherein said layer covers an area on said portion of said sheet, having an outline corresponding in plan view to the shaped article to be formed therefrom.

4. A continuous process according to claim 2, wherein said hot mold means comprise a mold face piece having exposed shaped article forming surfaces.

5. A continuous process according to claim 4, wherein said mold face piece is gas permeable and powder impermeable, and said synthetic resin material is introduced into said mold means by pneumatically depositing it as a layer on said surfaces.

6. A continuous process according to claim 4, wherein said mold face piece is electrically conductive, and said resin material is introduced into said mold means by electrostatically depositing it as a layer on said surfaces.

7. A continuous process according to claim 4, wherein said synthetic resin material is foamed polystyrene powder.

References Cited

UNITED STATES PATENTS

| | | |
|---|---|---|
| 2,556,237 | 6/1951 | Teichmann. |
| 3,015,479 | 1/1962 | Edberg et al. _____ 264—55 XR |
| 3,026,574 | 3/1962 | Takacs et al. _____ 264—53 XR |
| 3,160,689 | 12/1964 | Brunner _____ 264—54 |
| 3,285,795 | 11/1966 | Stein _____ 161—7 |
| 3,329,306 | 7/1967 | Stein _____ 264—292 XR |

FOREIGN PATENTS

| | | |
|---|---|---|
| 6,892 | 5/1963 | Japan. |
| 396,385 | 8/1933 | Great Britain. |
| 446,242 | 6/1927 | Germany. |
| 557,465 | 5/1958 | Canada. |
| 816,136 | 7/1959 | Great Britain. |

PHILIP E. ANDERSON, Primary Examiner

U.S. Cl. X.R.

18—4, 5, 19; 161—160; 264—26, 41, 47, 53, 54, 92, 112, 126, 234, 237, 334